Patented Feb. 20, 1934

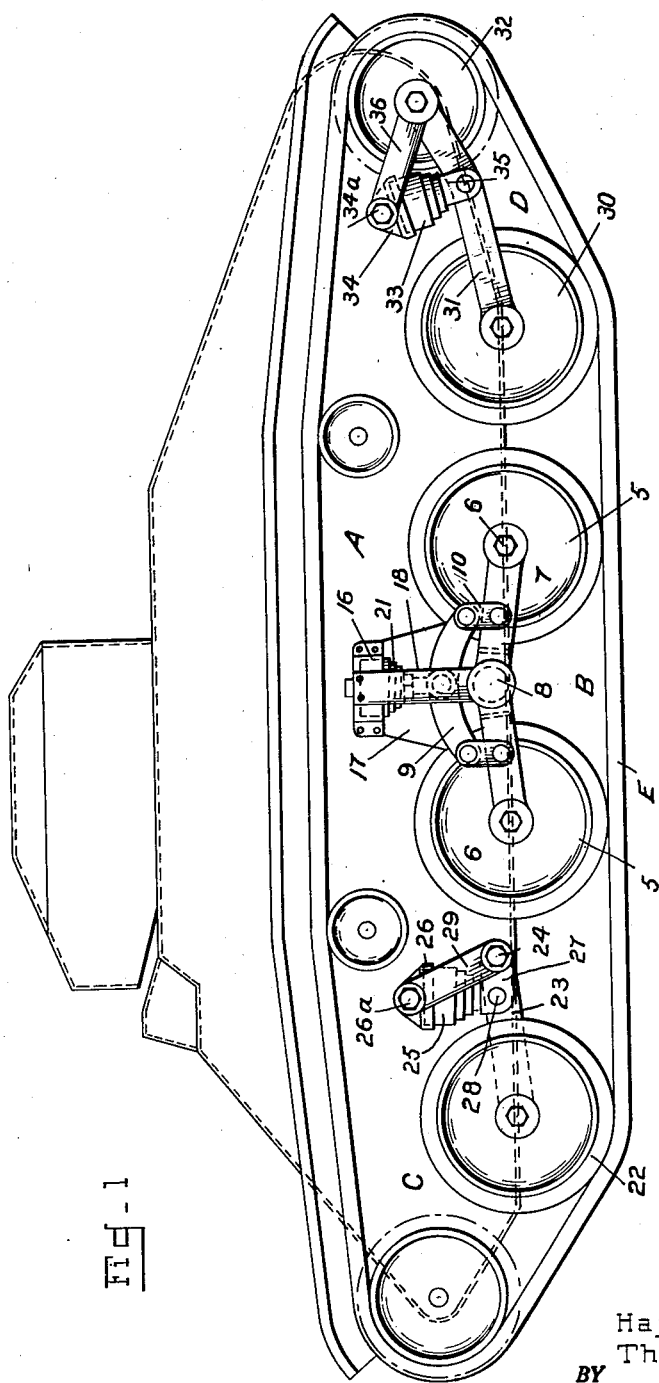

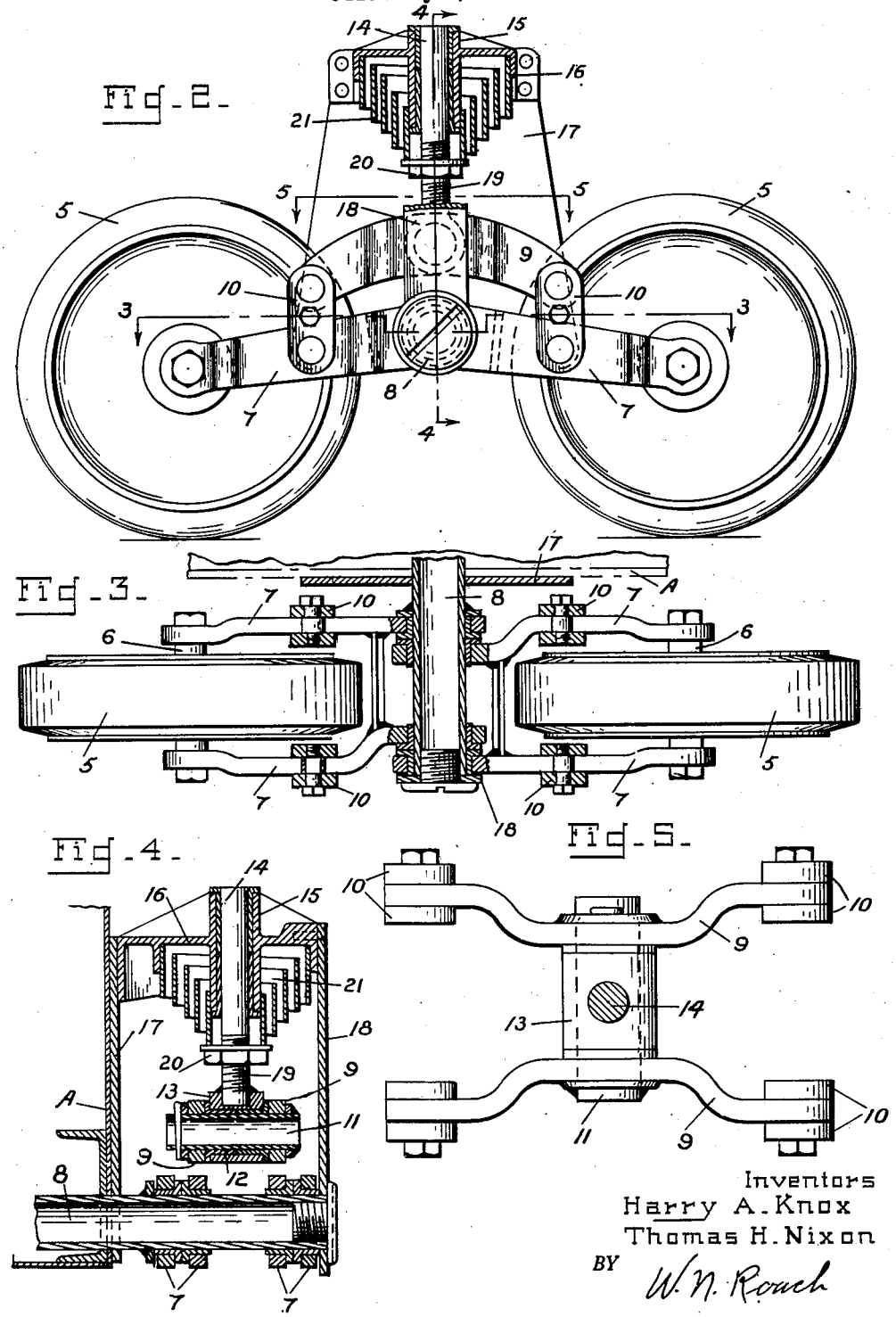

1,947,475

UNITED STATES PATENT OFFICE 1,947,475

SUSPENSION FOR TRACK-LAYING VEHICLES

Harry A. Knox, Davenport, Iowa, and Thomas H. Nixon, United States Army, Gettysburg, Pa., Application May 9, 1933. Serial No. 670,124

5 Claims. (Cl. 305—9)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a suspension for track-laying vehicles.

The principal object of the invention is to provide a suspension unit for vehicles having a high ratio between the strokes of a vertically movable wheel and a yielding element connecting the wheel to the vehicle body.

A further object is to provide a suspension unit in which a pair of independently mounted arms are associated through a linkage whereby a single spring may be employed to yieldingly connect the arms to the vehicle body.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a track-laying vehicle equipped with the improved suspension units.

Fig. 2 is an enlarged view in side elevation and partly in section of the central unit of Fig. 1.

Fig. 3 is a sectional view on the line 3—3 of Fig. 2.

Fig. 4 is a sectional view on the line 4—4 of Fig. 2 and

Fig. 5 is a plan view of the linkage taken on the line 5—5 of Fig. 2.

There is shown a vehicle body A supported on each side by wheel units B, C and D about which is trained an endless ground-engaging track E.

The central unit B consists of a pair of successively arranged wheels 5—5, each wheel having its axis 6 mounted in the extremities of a set of spaced arms 7—7. The sets of arms for the wheels are journaled independently of each other on a support shaft 8 carried by and projecting laterally from the body. The sets of arms are associated through a linkage consisting of spaced bars 9—9 overlying the shaft 8 and having their ends coupled to intermediate portions of the arms 7 by parallel links 10—10.

A pin 11 passing through the central portion of the bars 9 is fitted with a bushing 12 (Fig. 4) spacing the bars and mounting a rotatable sleeve 13. The sleeve 13 carries an elongated pilot column 14 at right angles to its axis and adapted to extend vertically through a bearing 15 in a bracket 16. The bracket 16 is secured to the body A by means of upright braces 17 and 18 mounted on the support shaft 8.

As shown in the wheel unit B the pilot column 14 has a threaded portion 19 for adjustably mounting a nut 20. A volute spring 21 having its inner coil seated on the nut 20 and its outer coil seated on the bracket 16 provides a yielding suspension between the body and the wheel unit. The volute spring possesses especial advantage in a suspension of this character because of its low height and short deflection and its excellent damping effect. By manipulation of the nut 20 the load of the vehicle may be removed from the unit B.

The front suspension unit C consists of a single wheel 22 carried on the front extremity of a single arm 23. The rear end of the arm 23 is journaled in a support shaft 24 projecting laterally from the body A. A volute spring 25 is confined between a bracket 26 mounted by means of a pin 26a on the body and a seat 27 that is journaled on the shaft 24 and has a laterally projecting pin 28 engaging the arm 23. The pin 28 is positioned on the arm at a distance from the shaft 24 equal to approximately one-fourth the length of the arm.

The outer end of the bracket 26 is additionally supported by a brace 29 mounted on the shaft 24 and pin 26a.

The rear suspension unit D consists of a single wheel 30 carried on the front extremities of a pair of spaced arms 31 journaled on the axle of the track sprocket wheel 32. A volute spring 33 is confined between a bracket 34 mounted by means of a pin 34a on the body and a spring seat 35 carried by the arms 31. The bracket 34 is additionally supported by a brace 36 mounted on the axle of the sprocket wheel 32, and on the pin 34a.

By mounting the wheels of the unit B on independent arms the ratio of movement between a wheel and the spring will be twice as great as when the arms are rigidly interconnected as shown in Patent No. 1,744,229 of January 21, 1930. This establishes a favorable condition for the employment of a volute spring having a short stroke in action without interfering with the equal distribution of the load to both wheels of the unit.

The front wheel unit C has the same four to one ratio of movement between wheel and spring as the center unit. This ratio is lowered in the rear unit D where it is approximately two and one-half to one.

As is well understood in the art the suspension may consist solely of a number of the units B, C or D. In all of these types the spring is positioned in the plane of the wheels and by virtue of its low height it will not interfere with the upper reach of the track.

We claim:

1. In a suspension for vehicles, a member to be supported, a shaft carried by said member and projecting laterally therefrom, a pair of arms journaled on the shaft independently of one another and extending in opposite directions, a wheel on the free end of each arm, a bar overlying the shaft, parallel links connecting the ends of said bar to intermediate portions of the pair of arms, a spring seat carried by the bar, a bracket on the supported member, a volute spring confined between the bracket and spring seat, and a brace between the shaft and the bracket.

2. In a suspension for vehicles, a member to be supported, a shaft carried by said member and projecting laterally therefrom, a pair of arms journaled on the shaft independently of one another and extending in opposite directions, a wheel on the free end of each arm, a bar overlying the shaft, parallel links connecting the ends of said bar to intermediate portions of the pair of arms, a spring seat carried by the bar, a bracket on the supported member, and a volute spring confined between the bracket and spring seat.

3. In a suspension for vehicles, a member to be supported, a shaft carried by said member and projecting laterally therefrom, a pair of arms journaled on the shaft independently of one another and extending in opposite directions, a wheel on the free end of each arm, a bar overlying the shaft, parallel links connecting the ends of said bar to intermediate portions of the pair of arms, a spring seat carried by the bar, a bracket on the supported member, a spring confined between the bracket and spring seat.

4. In a suspension for vehicles, a member to be supported, a shaft carried by said member, a pair of arms journaled on the shaft independently of one another and extending in opposite directions, a wheel on the free end of each arm, a linkage connecting intermediate portions of the arms, a bracket on the supported member, and a spring confined between the linkage and the bracket.

5. In a suspension for vehicles, a member to be supported, a pair of arms mounted on said member independently of one another, a wheel on each arm, a linkage connecting intermediate portions of the arms and a yielding connection between the linkage and the member to be supported.

HARRY A. KNOX.
THOMAS H. NIXON.